(No Model.) 2 Sheets—Sheet 2.
H. H. GORRINGE.
APPARATUS FOR ELEVATING AND DISTRIBUTING DREDGED AND OTHER MATERIALS.
No. 275,643. Patented Apr. 10, 1883.
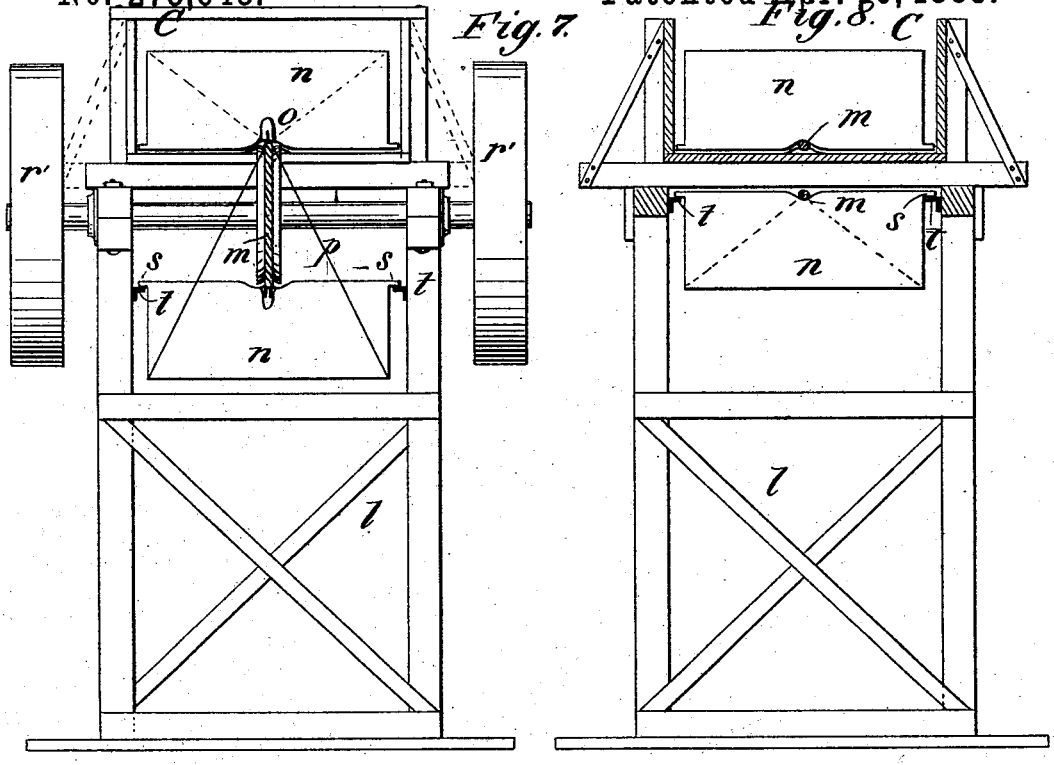
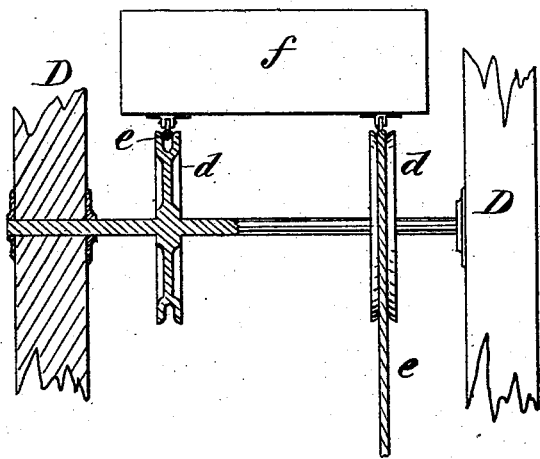
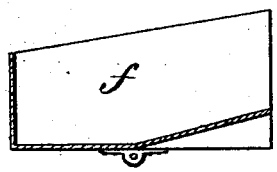
WITNESSES:
Wm Twitchell.
C. Sedgwick
INVENTOR:
H. H. Gorringe
BY Munn & Co
ATTORNEYS.

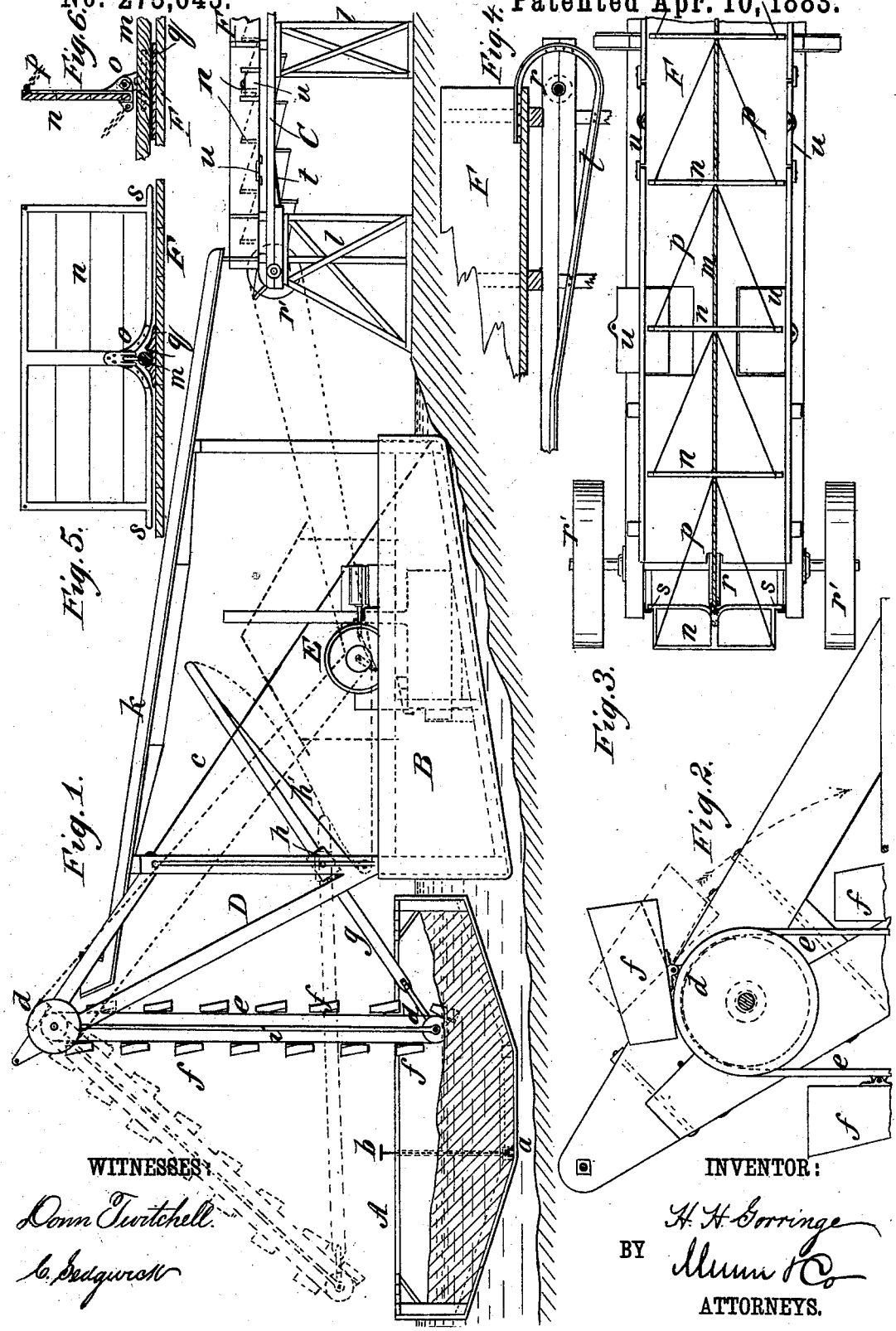

UNITED STATES PATENT OFFICE.

HENRY H. GORRINGE, OF NEW YORK, N. Y.

APPARATUS FOR ELEVATING AND DISTRIBUTING DREDGED AND OTHER MATERIALS.

SPECIFICATION forming part of Letters Patent No. 275,643, dated April 10, 1883.

Application filed December 27, 1882. (No model.)

*To all whom it may concern:*

Be it known that I, HENRY H. GORRINGE, of the city, county, and State of New York, have invented a new and Improved Apparatus for Elevating and Distributing Dredged and other Materials, of which the following is a full, clear, and exact description.

The object of my invention is to provide means for elevating dredged and other materials, and for carrying or conveying the same to any distance for distribution in filling up low grounds.

Reference is to be had to the accompanying drawings, forming a part of this specification, in which similar letters of reference indicate corresponding parts in all the figures.

Figure 1 is a sectional side elevation of my improved apparatus as arranged for elevating material from a scow and discharging the same to a distributer. Fig. 2 is an enlarged side view of the upper portion of elevator, showing the construction and arrangement of the buckets. Fig. 3 is a partial plan view of the distributer. Fig. 4 is a detail side view of the distributing-trough. Fig. 5 is a side elevation. Fig. 6 is a cross-section showing the construction and arrangement of the diaphragms in the distributing-trough. Fig. 7 is an end elevation; Fig. 8, cross-section of the distributing-trough. Fig. 9 is a detail section of the elevator, and Fig. 10 shows one elevator-bucket in section.

The whole method or system of operation is shown in Fig. 1, in which A is the boat or scow containing the material. B is the float carrying the elevating apparatus and the motor for operating the machine, and C is the distributing apparatus, which may be extended to any required distance. The scow A is provided at its under side with a valve, *a*, fitted for being opened or closed by a rod, *b*, so as to admit of the entrance of water for mixing with the material to form a semi-fluid mass. The float B is formed with one side of greater depth than the other, so that it has sufficient displacement to sustain the overhanging frame without counter-weighting, and at the same time may be moved closely to the shore in shallow water, as illustrated in Fig. 1, and the distance between the discharge-trough of the elevator and the distributing-trough thus reduced.

Upon the float B is a suitable frame, D, provided with tie-rods *c*, and overhanging the side of the float. This frame carries suitable shafting and pulleys, *d d*, around which pass two endless chains, *e e*, and to these chains are attached a series of buckets, *f*. The upper and lower shafts are connected by side struts or braces, *i*, and a strut, *g*, fitted to slide in a pivoted sleeve, *h*, on the vertical post of the frame D, is fastened at its outer end to the lower shafting and pulleys, *d*, so as to keep the elevator in position while working, and the strut *g* is fitted for movement in the sleeve *h* by a rope, *h'*, passing to a suitable windlass, so that the elevator can be swung clear of the scow, as shown in dotted lines, when necessary. The buckets *f* are hinged or pivoted at their mid-length to the endless chains *e*, so that as they pass beneath the lower pulleys *d* their open ends enter the material and the buckets become filled and empty themselves while passing over the upper pulleys *d*.

*k* is a trough, supported on the float B, for receiving the material from the buckets and carrying the same to the distributing apparatus C. To insure proper discharge of the material from the buckets, they are provided with a false side, (see Fig. 10,) which causes the material to be projected at an angle into the hopper or trough. Upon the float B is a suitable engine, E, for operating the elevator, and it serves also as a means for operating the distributing apparatus.

The distributing apparatus shown in Figs. 1, 3, and 4 consists as follows:

F is a trough of suitable form and dimensions, and supported in a horizontal or an inclined position upon bents or piling *l*, placed at proper distances apart on the space over which the material is to be deposited. An endless chain or rope, *m*, passes through and beneath the center of the trough, and carries a series of diaphragms, *n*, which are secured to the rope by means of hinged clamps *o* and studs *p*. This chain or rope rests upon a curved guideway, *q*, and passes over the pulleys *r*, placed at the ends of the trough upon suitable axles. Upon the axle at the end of the trough next to the elevator are driving-wheels $r'$, for connection of belting from the motor, so as to impart a progressive movement to the diaphragms through the trough. At the sides and lower edges of the diaphragm are lugs or flanges $s$, which, upon the return movement of the diaphragms beneath the trough, pass along guides $t$, which are fixed beneath the trough, so that the guides serve to keep the diaphragms in place. The trough F is provided with numerous sliding gates, $u$, placed at suitable distances apart in the bottom and sides of the trough, which, when opened, allow the escape of the material at the desired point.

In the operation of the apparatus the semi-fluid material is raised by the elevator and discharged from the buckets thereof into the trough $k$, through which it runs to the distributing-trough F. By the admission of water to the scow the material can be given any desired consistency, so that it will flow without manipulation to the elevating-buckets, from the buckets, through the trough, to the distributer, and through the distributer to the first open gate. The diaphragms $n$ serve to agitate the material and give it a forward movement, in case the inclination is not sufficient for it to flow freely, and in cases where not needed a greater or less number of diaphragms may be removed. By thus keeping the material in a semi-fluid state it distributes itself more evenly over the space to be filled in, and thus saves the labor of leveling. The water will run back into the river, leaving the material uniformly spread over the surface.

With this apparatus the cost and labor of elevating and distributing dredged and other materials are reduced to a minimum.

I do not limit myself in the use of this apparatus for the special purpose mentioned, as it may be used for elevating and conveying any material of a loose character.

Having thus fully described my invention, I claim as new and desire to secure by Letters Patent—

1. The combination, with the trough F, having guideway $q$, pulleys $r$, and guides $t$, of the endless chain or rope $m$, carrying diaphragms $n$, provided with lugs $s$, and movable through the trough, as and for the purpose specified.

2. The float B, formed with greater depth and carrying greater weight on one side than the other, whereby the lighter and shallower side can be brought close in shore, as described.

3. In an elevator, the buckets pivoted on and across the two chains which form the endless carrier, to adapt them to turn at the bottom and top of the chain-supporting frame, as shown and described.

4. The combination, with a scow, A, carrying an elevator, and a distributer, C, of an intermediate float supporting an inclined trough, $k$, adapted to transfer the material from the elevator over the float and into the distributer, as shown and described.

5. The combined apparatus consisting of the float B, an elevator carried by the float, a discharge-trough, $k$, and distributing-trough F, substantially as described, for the purpose of elevating and distributing dredged and other material.

HENRY H. GORRINGE.

Witnesses:
GEO. D. WALKER,
C. SEDGWICK.